(12) United States Patent
Man

(10) Patent No.: US 9,080,756 B2
(45) Date of Patent: Jul. 14, 2015

(54) ELECTRONIC FLASH DEVICE

(75) Inventor: Chun Nin Man, North Point (CN)

(73) Assignees: Nissin Industries Ltd., Hong Kong (CN); Chikara Goto, Tokyo (JP)

( * ) Notice: Subject to any disclaimer, the term of this patent is extended or adjusted under 35 U.S.C. 154(b) by 155 days.

(21) Appl. No.: 13/990,833

(22) PCT Filed: Jul. 20, 2011

(86) PCT No.: PCT/JP2011/004091
§ 371 (c)(1),
(2), (4) Date: May 31, 2013

(87) PCT Pub. No.: WO2012/081138
PCT Pub. Date: Jun. 21, 2012

(65) Prior Publication Data
US 2013/0250542 A1  Sep. 26, 2013

(30) Foreign Application Priority Data

Dec. 13, 2010 (JP) .................................. 2010-276619

(51) Int. Cl.
*H01J 11/00* (2012.01)
*F21V 29/00* (2015.01)
*G03B 15/05* (2006.01)

(52) U.S. Cl.
CPC .............. *F21V 29/004* (2013.01); *G03B 15/05* (2013.01); *G03B 2215/0578* (2013.01); *G03B 2215/0582* (2013.01)

(58) Field of Classification Search
CPC ............ H01J 35/22; H01J 61/80; H01J 61/90
See application file for complete search history.

(56) References Cited

U.S. PATENT DOCUMENTS 4,342,940 A * 8/1982 Mrusko et al. ................. 313/594
6,008,583 A * 12/1999 Breuer et al. ................. 313/594

FOREIGN PATENT DOCUMENTS

| JP | S61-179576 U | 11/1986 |
|----|--------------|---------|
| JP | H02254433 A | 10/1990 |
| JP | 3014657 Y | 6/1995 |
| JP | H10213844 A | 8/1998 |
| JP | 2003140232 A | 5/2003 |
| JP | 2008140656 | 6/2008 |

OTHER PUBLICATIONS

PCT International Search Report for PCT/JP2011/004091, dated Aug. 5, 2011.

* cited by examiner

*Primary Examiner* — Andrew Coughlin
(74) *Attorney, Agent, or Firm* — Dority & Manning, P.A.

(57) ABSTRACT

To provide an electronic flash device which is capable of reducing the variation in the amount of light when flashing is performed repeatedly by a flash discharge tube and which can be manufactured efficiently, the electronic flash device is provided with a trigger electrode 16 formed of a wire member extending along a longitudinal direction of a discharge tube main body 11 of a flash discharge tube 10.

7 Claims, 5 Drawing Sheets

ELECTRONIC FLASH DEVICE

TECHNICAL FIELD

The present invention relates to an electronic flash device, and in particular to an electronic flash device for use in a strobe (flashing) device of a still camera or the like.

BACKGROUND ART

An electronic flash device includes a flash discharge tube consisting of a cylindrical glass tube provided with a pair of discharge electrodes at either end thereof and having an interior filled with a rare gas, a trigger electrode disposed outside the flash discharge tube, and a reflector disposed on a rear side of the flash discharge tube. When a high voltage is applied to the trigger electrode, and as a result, the filler gas is ionized causing an abrupt decrease of the impedance between the pair of discharge electrodes, a discharge takes place between the discharge electrodes so that the flash discharge tube generates flash light.

In some of such electronic flash devices, the trigger electrode is made of a wire disposed so as to contact an outer circumferential surface of the flash discharge tube and extend along the longitudinal direction of the flash discharge tube (e.g., see Patent Document 1). When the flash discharge tube generates flash light repeatedly in a low, the temperature of the trigger electrode increases, causing thermal expansion of the trigger electrode.

In a case where each end of the trigger electrode is fixedly secured to the outer circumferential surface of the flash discharge tube by means of a ring, band or the like to mount the trigger electrode on the flash discharge tube, the thermal expansion of the trigger electrode may cause the trigger electrode, which is originally straight, to warp, and the thermal deformation may change the contact state between the trigger electrode and the outer circumferential surface of the flash discharge tube. The change in the contact state may cause a change in the voltage applied to the filler gas from the trigger electrode, which in turn may create problems such as unstable flashing of the flash discharge tube or variation in the amount of flash light.

To address such problems, it has been proposed to divide the trigger electrode into two halves in the longitudinal direction of the flash discharge tube, and fix only one outer end of each half of the trigger electrode to the flash discharge tube while leaving the other end free to move, thereby to achieve a structure in which the thermal expansion of the trigger electrode is not restrained and thus the thermal deformation of the trigger electrode is avoided (e.g., see Patent Document 2).

PRIOR ART DOCUMENT(S)

Patent Document(s)

Patent Document 1: JP 2008-140656A
Patent Document 2: JP 3014657Y

BRIEF SUMMARY OF THE INVENTION

Task to be Accomplished by the Invention

However, in the electronic flash devices of the prior art, the number of component parts is increased only for the purpose of avoiding thermal deformation of the trigger electrode, and further, the mounting structure for the trigger electrode is complicated. Such an electronic flash device is not suitable as a compact electronic flash device such as for use in a strobe device of a compact camera, in particular.

The present invention is made to address the aforementioned problems, and the purpose of the present invention is to provide an electronic flash device which can avoid a change in the contact state between the trigger electrode and the outer circumferential surface of the flash discharge tube due to thermal deformation of the trigger electrode without increasing the number of component parts and complicating the mounting structure, such that the electronic flash device can be suitable as a compact electronic flash device for use in a strobe device of a compact camera.

Means to Accomplish the Task

To accomplish the above task, the present invention provides an electronic flash device, comprising: a flash discharge tube consisting of a cylindrical glass tube provided with a pair of discharge electrodes at either end thereof and having an interior filled with a rare gas; a trigger electrode disposed outside the flash discharge tube; and a reflector disposed on a rear side of the flash discharge tube, wherein the trigger electrode is formed of a wire member or ribbon-shaped plate member extending along a longitudinal direction of the flash discharge tube, and comprises a linear section extending in a direction along a generating line of an outer circumferential surface of the flash discharge tube and a wave-shaped section including a portion that is bent and extends in a tangential direction of the outer circumferential surface of the flash discharge tube at a position where the linear section is in contact with the flash discharge tube.

According to this structure, when the trigger electrode undergoes thermal expansion, the wave-shaped section elastically deforms, whereby a change in the contact state of the trigger electrode on the outer circumferential surface of the flash discharge tube can be prevented. This avoids a variation in the amount of flash light when flashing is performed repeatedly by the flash discharge tube.

The electronic flash device according to the present invention preferably further comprises an elastic member urging the flash discharge tube toward the reflector, wherein the wave-shaped section of the trigger electrode is pressed against the reflector by an urging force of the elastic member via the flash discharge tube.

According to this structure, it is ensured that the positional relationship between the flash discharge tube and the reflector does not change under normal use, and the variation in the amount of light at the light emitting port of the reflector is reduced.

In the electronic flash device according to the present invention. preferably, the trigger electrode comprises a pair of C-shaped annular sections at either end thereof, each C-shaped annular section being configured to surround an outer circumference of the flash discharge tube and fitted on the outer circumference of the flash discharge tube to mount the trigger electrode on the flash discharge tube.

According to this structure, the trigger electrode can be mounted on the outer circumference of the flash discharge tube easily without need for additional mounting parts.

Effect of the Invention

In the foregoing electronic flash device according to the present invention, when the trigger electrode undergoes thermal expansion, elastic deformation of the wave-shaped section prevents a change in the contact state of the trigger electrode on an outer circumferential surface of the flash discharge tube, and thus, a variation in the amount of flash light can be avoided when flashing is performed repeatedly by the flash discharge tube.

PREFERRED EMBODIMENT OF THE INVENTION

Figure 1:
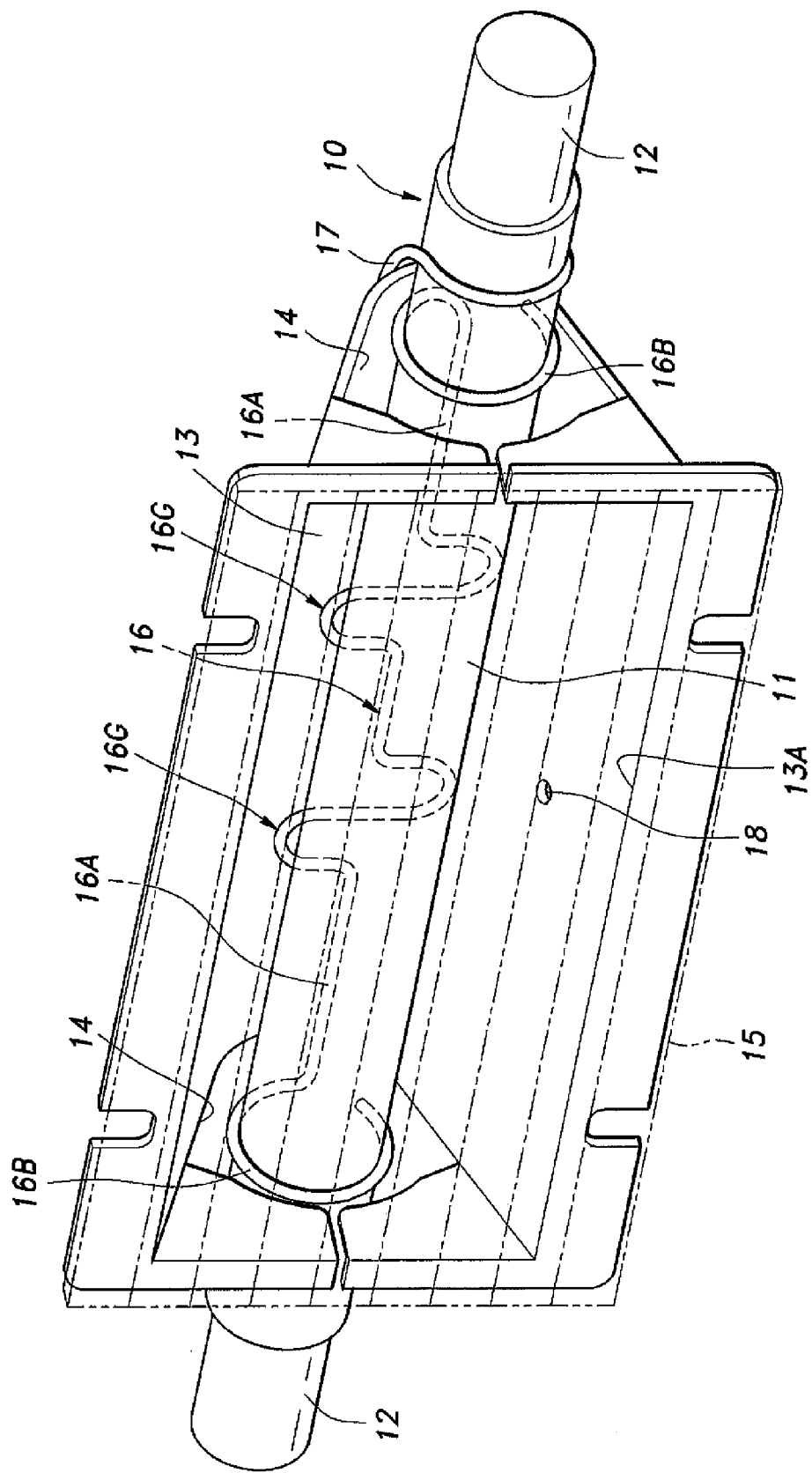
FIG. 1 is a front perspective view of an embodiment of an electronic flash device according to the present invention.
Figure 2:
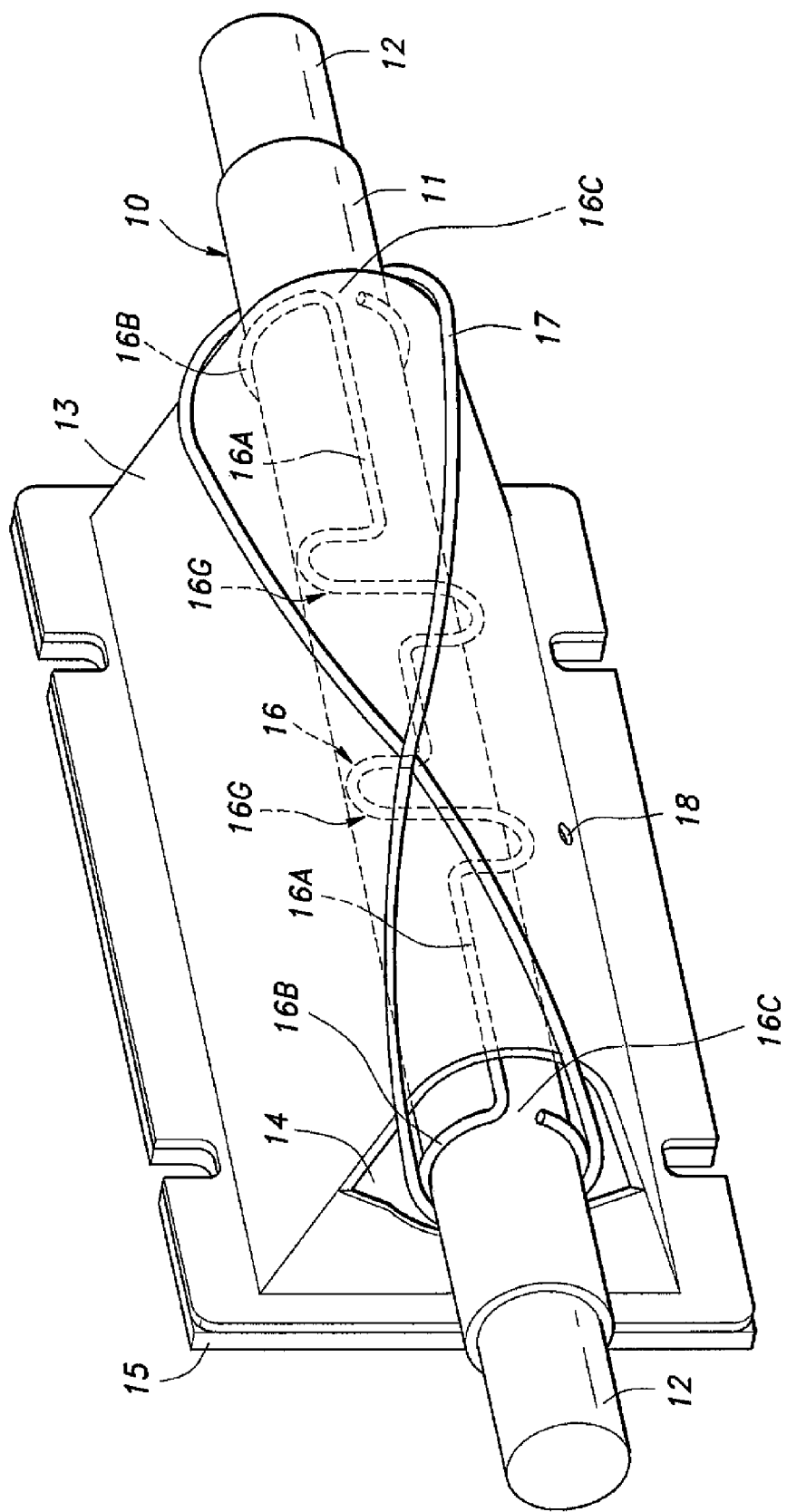
FIG. 2 is a rear perspective view of an embodiment of an electronic flash device according to the present invention.
Figure 3:
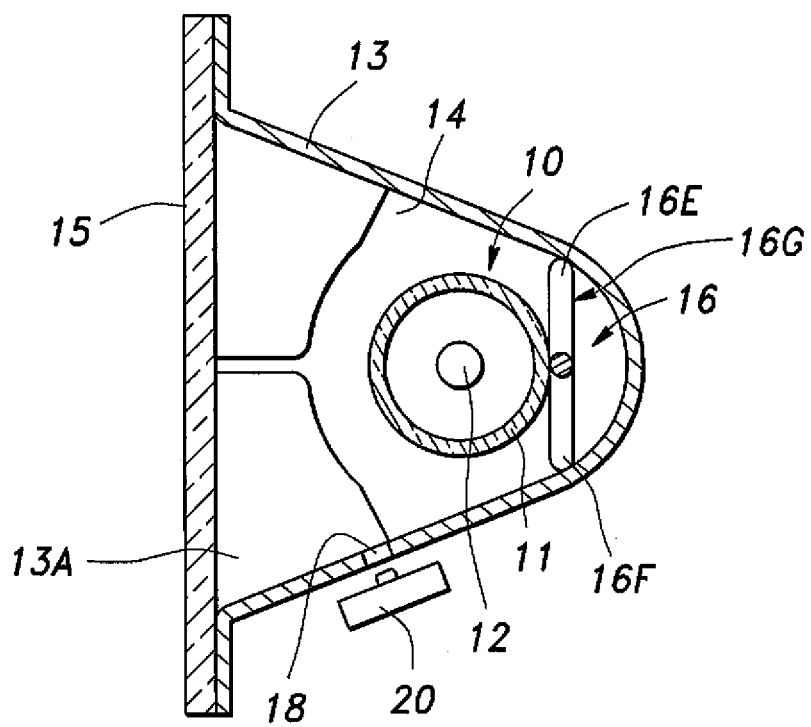
FIG. 3 is a vertical cross-sectional view of the electronic flash device according to the embodiment.
Figure 4:
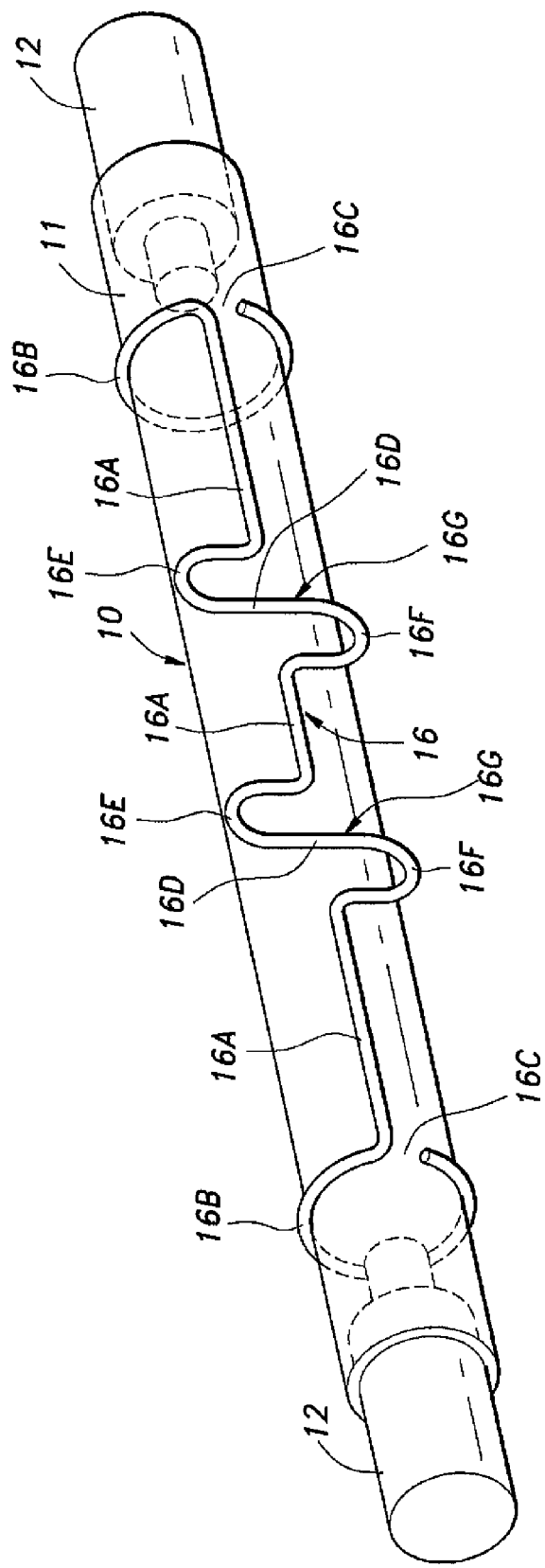
FIG. 4 is a perspective view showing an assembly of a flash discharge tube and a trigger electrode used in the electronic flash device according to the embodiment.
Figure 5:
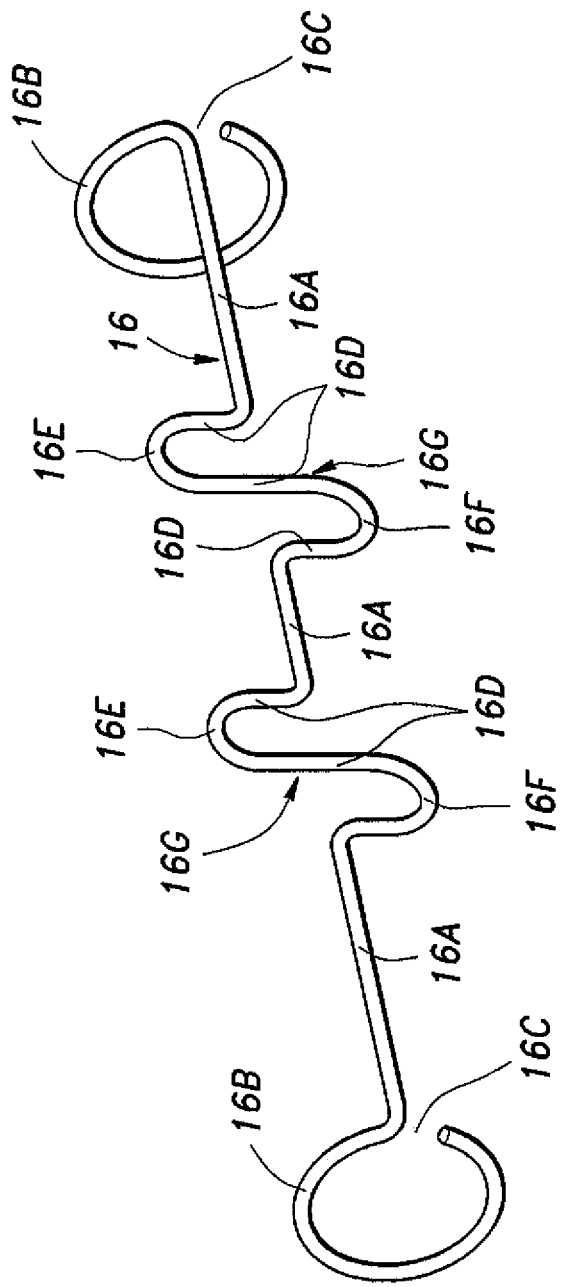
FIG. 5 is a perspective view of the trigger electrode used in the electronic flash device according to the embodiment.

Now, description will be given of an embodiment of an electronic flash device according to the present invention with reference to FIGS. 1-5.

The electronic flash device includes a flash discharge tube 10. The flash discharge tube 10 includes a discharge tube main body 11 consisting of a cylindrical, transparent glass tube, and a pair of discharge electrodes 12 closing the respective lateral ends of the discharge tube main body 11 and opposed to each other within the discharge tube main body 11. The interior of the discharge tube main body 11 is filled with a rare gas such as xenon.

A reflector 13 is disposed on a rear side of the flash discharge tube 10 (more specifically, on a rear side of the discharge tube main body 11). The reflector 13 is formed of a semi-cylindrical concave mirror defining a paraboloidal surface and having closed lateral ends. The discharge tube main body 11 is positioned at the focal point of the reflector 13, and the lateral ends of the discharge tube main body 11 protrude outside the reflector 13 through openings 14 formed in either lateral end of the reflector 13.

The part of the reflector 13 positioned in front of the flash discharge tube 10 includes a light emitting port 13A which is rectangular in shape and through which the light generated by the flash discharge tube 10 is emitted. A Fresnel lens plate 15 is attached to the frontal part of the reflector 13 to close the light emitting port 13A.

A light receiving sensor 20 is disposed outside the reflector 13. The light receiving sensor 20 quantitatively measures the amount of light within the reflector 13 through a photometric hole 18 formed in the reflector 13. The amount of light measured by the light receiving sensor 20 is used as a feedback compensation signal in a known feedback control of the amount of flash light generated by the flash discharge tube 10.

A trigger electrode 16 is disposed on the outer circumference of the discharge tube main body 11. The trigger electrode 16 is formed of a thin wire member having a circular cross section and extending along the longitudinal direction (axial direction) of the discharge tube main body 11. The wire member suitable for forming the trigger electrode 16 may be a wire member made of a metallic material, such as phosphor bronze, stainless steel, spring steel, etc. and having a spring property. The diameter of the trigger electrode 16 should be small but with sufficient strength and rigidity, and practically is of the order of 0.1 to 1.0 mm. The optimum diameter of the wire member may be determined depending on the outer diameter of the discharge tube main body 11.

A large part of the trigger electrode 16 is formed of a linear section 16A that extends in a direction of a generating line (a line parallel with the tube axis) of the outer circumferential surface (glass tube outer circumferential surface) of the discharge tube main body 11 and contacts the outer circumferential surface of the discharge tube main body 11, where the linear section 16A serves as an effective part of the trigger electrode of the flash discharge tube 10. Namely, the linear section 16A extends linearly along the longitudinal direction of the discharge tube main body 11, and, in the best mode embodiment, is in direct contact with the outer circumferential surface of the discharge tube main body 11 on the rear side of the same. This contact is realized as a line contact between the outer circumferential surface of the linear section 16A having a circular cross section and the outer circumferential surface of the discharge tube main body 11 having a circular cross section.

The trigger electrode 16 has a pair of C-shaped annular sections 16B formed at either lateral end thereof, such that each C-shaped annular section 16B is bent at 90 degrees relative to the linear section 16A and is curved to surround the outer circumference of the flash discharge tube 10. Each C-shaped annular section 16B is elastically fitted on the outer circumference of a part of the discharge tube main body 11 adjacent to the corresponding end of the discharge tube main body 11 and positioned laterally outside the reflector 13. Owing to such a structure, the trigger electrode 16 is securely mounted to the flash discharge tube 10 by the restoring force of the elastically deformed C-shaped annular sections 16B without need for additional mounting parts.

Each of the C-shaped annular sections 16B may include a part curved in a C-shape over a circumferential angle of about 270 to 315 degrees to define an opening 16C extending over a circumferential angle of about 90 to 45 degrees, whereby the discharge tube main body 11 can be inserted into the C-shaped annular section 16B through the opening 16C in a radial direction such that the C-shaped annular section 16B is deformed and fitted on the outer circumference of the discharge tube main body 11. Thus, the trigger electrode 16 can be mounted on the outer circumference of the discharge tube main body 11 easily by simply pushing the discharge tube main body 11 into the C-shaped annular sections 16B.

It is to be noted that, if necessary, an adhesive may be applied to the engagement part between the discharge tube main body 11 and each C-shaped annular section 16B to increase the attachment strength between them.

Further, the trigger electrode 16 has a pair of wave-shaped sections 16G formed at two longitudinally middle parts thereof, such that each wave-shaped section 16G includes a portion 16D extending in a tangential direction (vertical direction) of the outer circumferential surface of the discharge tube main body 11 at the position where the linear section 16A is in contact with the discharge tube main body 11, an upper U-turn portion 16E positioned above the linear section 16A and a lower U-turn portion 16F positioned below the linear section 16A, the portions 16D, 16E and 16F being arranged to form a substantially S-shape. Thus, in the illustrated embodiment, the effective part of the trigger electrode 16 is formed of the linear section 16A extending linearly along the longitudinal direction of the discharge tube main body 11 excluding the wave-shaped sections 16G.

Owing to the substantially S shape, each wave-shaped section 16G assumes a spring property allowing it to flex or elastically deform in the longitudinal direction of the trigger electrode 16 upon application of a load. Thus, when the trigger electrode 16 having each end fixedly secured to the discharge tube main body 11 undergoes thermal expansion, the wave-shaped sections 16G deforms elastically and thereby prevents the entire trigger electrode 16 from warping in an arcuate shape, and thus, a change in the contact state of the linear section 16A on the glass tube outer circumferential surface can be avoided.

This stabilizes the triggering performed by the trigger electrode 16, and reduces the variation in the amount of flash light when flashing is performed repeatedly by the flash discharge tube 10. Since the trigger electrode 16 consists of a single component part including the wave-shaped sections 16G, the trigger electrode 16 does not increase the number of component parts nor complicate the mounting structure for the trigger electrode 16.

Thus, an electronic flash device suitable as a compact electronic flash device for use in a strobe device of a compact camera is provided.

A closed-loop clamp band 17 made of an elastic material such as silicon rubber or the like is wrapped around lateral end portions of the discharge tube main body 11 located outside the reflector 13. The clamp band 17 is wrapped around the lateral end portions of the discharge tube main body 11 such that the clamp band 17 has portions diagonally crossing each other on the rear side of the reflector 13, whereby the clamp band 17 serves as an elastic member urging the discharge tube main body 11 toward the rear part of the reflector 14 (the part opposite to the light emitting port 15).

In such a structure, the trigger electrode 16 is urged toward the rear part of the reflector 14 together with the discharge tube main body 11, such that the upper U-turn portion 16E and the lower U-turn portion 16F of each wave-shaped section 16G positioned on the rear side of the discharge tube main body 11 are pressed against and in contact with the reflector 14.

Therefore, though the discharge tube main body 11 is not in contact with the reflector 14, it is possible to stabilize the positional relationship between the discharge tube main body 11 and the reflector 14, and it is ensured that this positional relationship does not change under normal use.

Since it is ensured that the positional relationship between the discharge tube main body 11 and the reflector 14 does not change under normal use, the variation in the amount of light emitted through the light emitting port 15 also can be reduced.

It is to be noted that the linear section 16A of the trigger electrode 16 does not necessarily have to be in contact with the outer circumferential surface of the discharge tube main body 11 and may be spaced from the outer circumferential surface of the discharge tube main body 11 by a small gap, so long as the trigger electrode 16 performs a required function of a trigger electrode reliably. Further, the mounting of the trigger electrode 16 to the discharge tube main body 11 may be realized by means or structure other than the C-shaped annular sections 16B, such as an adhesive. Furthermore, the trigger electrode 16 is not limited to a wire member but may be formed of a ribbon-shaped plate member that can be fabricated by press working.

The present invention has been described in the foregoing in terms of preferred embodiments thereof. However, as is apparent to a person having ordinary in the art, the present invention is not limited by the foregoing embodiments, and various alterations and modifications are possible without departing from the spirit of the present invention. Further, not all of the parts shown in the foregoing embodiments are necessarily indispensable, and they may be selectively used as appropriate without departing from the spirit of the present invention.

The contents disclosed in the original Japanese patent application (Japanese Patent Application No. 2010-276619 filed on Dec. 13, 2010) on which the Paris Convention priority claim is made for the present application are incorporated herein in their entirety by reference. Further, the contents of the original patent application on which the Paris Convention priority claim is made for the present application, as well as the contents of any prior art references mentioned in the disclosure of the present application, are incorporated herein in their entirety by reference.

GLOSSARY 10 flash discharge tube
11 discharge tube main body
12 discharge electrode
13 reflector
13A light emitting port
14 opening
15 Fresnel lens plate
16 trigger electrode
16A linear section
16B C-shaped annular section
16C opening
16D tangentially extending portion
16E upper U-turn portion
16F lower U-turn portion
16G wave-shaped section
17 clamp band
18 photometric hole
20 light-receiving sensor

The invention claimed is:

1. An electronic flash device, comprising:
a flash discharge tube consisting of a cylindrical glass tube provided with a pair of discharge electrodes at either end thereof and having an interior filled with a rare gas; and
a trigger electrode disposed outside the flash discharge tube,
wherein the trigger electrode is formed of a wire member or ribbon-shaped plate member extending along a longitudinal direction of the flash discharge tube, and comprises a linear section extending in a direction along a generating line of an outer circumferential surface of the flash discharge tube and a wave-shaped section including a tangentially extending portion that extends in a tangential direction of the outer circumferential surface of the flash discharge tube at a position where the linear section is in contact with the flash discharge tube, the wave-shaped section further including an upper curved portion extending above the linear section and a lower curved position extending below the linear section, the tangentially extending portion extending between the upper and lower curved portions.

2. The electronic flash device according to claim 1, further comprising a reflector disposed on a rear side of the flash discharge tube and an elastic member urging the flash discharge tube toward the reflector, wherein the wave-shaped section of the trigger electrode is pressed against the reflector by an urging force of the elastic member via the flash discharge tube.

3. The electronic flash device according to claim 2, wherein the trigger electrode comprises a pair of C-shaped annular sections at either end thereof, each C-shaped annular section being configured to surround an outer circumference of the flash discharge tube and fitted on the outer circumference of the flash discharge tube to mount the trigger electrode on the flash discharge tube.

4. The electronic flash device according to claim 1, wherein the trigger electrode comprises a pair of C-shaped annular sections at either end thereof, each C-shaped annular section being configured to surround an outer circumference of the flash discharge tube and fitted on the outer circumference of the flash discharge tube to mount the trigger electrode on the flash discharge tube.

5. The electronic flash device according to claim 1, wherein the wave-shaped section is configured to elastically deform in the longitudinal direction of the flash discharge tube when the trigger electrode undergoes thermal expansion.

6. The electronic flash device according to claim 1, wherein the upper and lower curved portions of the wave-shaped section are oriented relative to the tangentially extending portion of the wave-shaped section such that wave-shaped section forms a substantially S-shape.

7. The electronic flash device according to claim 1, wherein the upper and lower curved portions of the wave-shaped section are spaced apart from one another by the tangentially extending portion of the wave-shaped section.

\* \* \* \* \*